Patented Oct. 2, 1945

2,385,911

UNITED STATES PATENT OFFICE 2,385,911

CONDENSATION PRODUCTS OF ALDEHYDES AND UNSATURATED ESTER AMIDES

Albert G. Chenicek, Barberton, Ohio, assignor to Pittsburgh Plate Glass Company, Pittsburgh, Pa., a corporation of Pennsylvania No Drawing. Application June 16, 1941,
Serial No. 398,318

10 Claims. (Cl. 260—72)

This invention relates to condensation products and to the polymers thereof. In accordance with the present invention it has been found that desirable products may be secured by reaction of an aldehyde with an unsaturated alcohol ester of an acid which contains at least one amide group and at least one acid group; for example, the unsaturated esters of oxamic, malonamic, succinamic, carbamic, adipamic, phthalamic acids or the monoamide of citric, tartaric, or tricarballylic acids, etc. Many of these ester amides may be prepared by direct esterification of the corresponding acids or by reaction of silver or sodium salts thereof with unsaturated halides or by reaction of ammonia with a diester of the corresponding dibasic acid, or they may be made by reaction of the corresponding salts of the acid amides such as silver salts with unsaturated halides, particularly unsaturated iodides.

The invention is particularly related to the esters of unsaturated alcohols containing up to 10 carbon atoms. Most actively polymerizable materials may be secured from esters or thioesters of alcohols containing up to 5 carbon atoms including propenyl, butenyl, or pentenyl esters, for example, the esters of vinyl, allyl, isopropenyl, propargyl, tiglyl, β-ethyl allyl, α-ethyl allyl, methallyl, butadienyl, or crotyl alcohols, or methyl vinyl carbinol or ethyl vinyl carbinol. In addition, somewhat less actively polymerizable materials may be secured from esters of linalol, or cinnamyl alcohol.

The condensation products are obtained by treatment of the esters with aldehydes such as formaldehyde, paraformaldehyde, acetaldehyde, butyraldehyde, acrolein, crotonaldehyde, methacrolein, β-ethyl acrolein, furfural, benzaldehyde, glyoxal or compounds capable of acting as aldehydes such as hexamethylene tetramine. Thus, allyl and methallyl esters of the above amides may be reacted with an aldehyde such as formaldehyde, acetaldehyde, or other of the above mentioned aldehydes.

When less than one mole and preferably about one-half mole of aldehyde is used per mole of ester, a condensation product which is generally a crystalline solid is obtained. Thus, one mole of allyl carbamate may be reacted with formaldehyde to form a compound having the following probable formula:

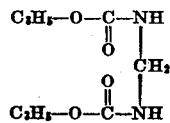

The reaction may be effected by mixing the aldehyde and the ester, preferably in the presence of an acid catalyst. While the mixture may be heated, if necessary, the reaction often proceeds with such vigor that cooling the reaction to below 50° C. is necessary. The product obtained generally crystallizes and the crystals may be collected and washed with water until neutral and thereafter dried by suitable means.

Products of a different type may be secured by reacting one or more moles of aldehyde with one mole of ester in the presence of an acid catalyst and recovering the nonaqueous phase. These products are often viscous high boiling liquids which may crystallize to form solids upon standing. Their composition is unknown.

Condensation products also may be prepared by conducting the reaction in the presence of alkaline catalysts such as barium hydroxide. These compounds are probably N-methylol derivatives. In general, they are high boiling liquids or solids.

Most of the above condensation products are substantially insoluble in water and are soluble in various organic solvents such as acetone, ether, benzene, toluene or xylene. They are stable over long periods of time. Certain of these materials such as the derivatives of allyl oxamide are readily hydrolyzed. They may be used for various purposes such as plasticizers, fillers for plastic or resinous compositions or as modifiers in paint compositions.

Solid or oily resinous products may be secured by heating the unsaturated ester amides for a prolonged period of time, generally at high temperatures, for example, 150 to 250° C., for several hours, with two or more moles of aldehyde per mole of ester. Often pressure is applied or the reaction may be conducted in a closed vessel.

Thus, where non-resinous products are desired, it is preferred to avoid prolonged heating at high temperatures.

The condensation products, particularly the non-resinous condensation products as herein described, polymerize to form a wide range of polymers varying from soluble fusible products to insoluble infusible polymers. This polymerization may be conducted in the presence of polymerization catalysts capable of polymerizing the unsaturated groups such as oxygen catalysts including oxygen, ozone, peroxides such as acetone peroxide, benzoyl peroxide, lauryl peroxide or tetralin peroxide.

Polymers which are very clear, transparent and hard may be secured. The condensation products may be cast polymerized to form cast polymers of various shapes or intermediate polymers which may be molded may be obtained. These intermediate polymers may be soluble and fusible, or if desired, intermediate polymers having a gel-like structure and containing more or less insoluble polymer may be secured. These polymers may be obtained by interrupting polymerization at the proper time.

In general, the fusible soluble polymers are soluble in various organic solvents such as acetone carbon tetrachloride, benzene, xylene, toluene, dioxane, etc. Both types of these intermediate polymers may be further polymerized to an infusible state to form products similar to the infusible polymers mentioned above. Thus, these intermediate polymers may be molded or otherwise shaped and polymerized by means of heat and/or light to form shaped products which are substantially infusible and insoluble and which retain their shape permanently.

The soluble fusible polymers herein described may be prepared by polymerizing the unsaturated compounds, preferably in solution or at a temperature above the melting point of normally solid condensation products until substantial polymerization has occurred and interrupting polymerization before the polymer is converted into an infusible polymer, preferably while the polymer remains viscous. It is found that when polymerization of these materials is initiated, a fusible polymer is preliminarily formed. As polymerization proceeds, the monomer-polymer mixture is converted into a gel which contains a substantial portion of insoluble polymer. Upon further polymerization of the gel it is further converted to a tougher, more abrasion-resistant polymer which may, in some cases, be substantially infusible. By interrupting polymerization before the polymer is converted to a gel and while the polymer is viscous, it is possible to obtain a fusible polymer. This interruption may be effected by cooling, addition of inhibitors, or by other methods. If desired, the fusible polymer may be recovered substantially free from monomer or at least as a concentrate containing substantially less monomer than is present in the monomer-polymer mixture formed by ordinary polymerization of undiluted monomer.

The fusible polymer may be obtained by polymerization of the monomeric compound or a solution thereof. In general, it is possible to secure the fusible material in superior yields by polymerizing the monomer in a solution in which the fusible polymer is normally soluble and interrupting polymerization before the polymer is converted into a gel. This polymer is generally soluble in the solvents which are capable of dissolving the usual thermoplastic vinyl or acrylic resins such as polymethyl methacrylate or polyvinyl acetate. Thus, such solvents as acetone, dioxane, chloroform, toluene, benzene, carbon tetrachloride, methyl Cellosolve acetate, phenyl cellosolve, dichlorethylether, xylene, tetralin, dibutyl phthalate, trichoroethylene, tetrachloroethane, etc., or mixtures of these solvents generally are found to be suitable. Solutions having concentrations of 10 to 60 percent of monomer yield very satisfactory results.

In any case the polymerization may be interrupted before the infusible product is produced. This may be accomplished by stopping polymerization as the mixture of monomer and polymer begins to grow viscous and before gel formation occurs. In accordance with one illustrative method of interrupting polymerization, the polymer may be separated from the monomer by convenient methods, for example, by the addition of a compound in which the polymers are normally insoluble, such as methyl or ethyl alcohol, petroleum ether, water, ethylene glycol, etc. This process permits the isolation of the fusible polymer in a substantially pure state and is particularly adapted to use when the materials are polymerized in solution. Polymerization may also be halted by lowering the temperature of the reaction mixture to a suitable degree, for example, to room temperature or below. In accordance with another effective method of interrupting polymerization, inhibitors such as pyrogallol, hydroquinone, aniline, phenylene diamine or sulphur may be added to the polymer during polymerization or before polymerization has been initiated.

In polymerization of the compounds herein contemplated, the time required in order to initiate polymerization and to secure a fusible polymer varies widely in view of slight traces of peroxides or inhibitors which may be present. For this reason, the viscosity of the composition undergoing polymerization is observed and, in general, polymerization is interrupted after the viscosity of the composition has approximately doubled. In many cases, subjection of the compound to polymerization conditions for a period of one-half to two hours is sufficient, although some compounds polymerize somewhat more slowly.

The fusible polymer produced by polymerization of diluted or undiluted monomer may be molded or cast to any desired shape, and subsequently cured to the infusible state. In treating many of the materials, however, it is found that if considerable monomer is retained in the polymer, considerable difficulty may be encountered, upon curing, in securing complete or substantially complete polymerization of the residual monomer without formation of undesirable soft products or of products containing cracks, bubbles, and other defects. Accordingly, we have found that in many cases it is desirable to remove all or a portion of such monomer from the polymer prior to curing the polymer to its infusible state. In accordance with one convenient method, the polymer may be separated by addition of a nonsolvent such as water, ethyl or methyl alcohol, glycol, etc. Alternatively, the monomer and/or solvent may be distilled from the polymer under conditions whereby further polymerization is minimized, for example, by distillation in a vacuum, preferably at low temperatures, and/or in the presence of added inhibitors. When the monomer-polymer mixture is semi-solid or solid, the product may be dispersed or extracted, with a suitable solvent for the monomer in which the polymer is insoluble, such as methyl or ethyl alcohol. Additionally, the polymer and monomer may be separated by dissolving the product in a solvent for both monomer and polymer and adding a nonsolvent to precipitate the fusible polymer.

As previously noted, we have found that upon subjection of these fusible polymers to heating at temperatures somewhat above the softening point thereof, for a sufficient period of time, they are converted into an infusible, insoluble and transparent, hard and wear-resistant product. This conversion is preferably assisted by the incorporation of usual polymerization catalysts, such as oxygen, ozone, air, peroxides such as hydrogen peroxide, benzoyl peroxide, or lauryl peroxide, or other oxygen catalyst, basic or acidic catalysts, light, etc.

The resins herein contemplated are capable of use in many fields. Thus, the monomer, syrupy polymer or fusible polymer may be used for coating or impregnation of wood, paper, cloth or other fibrous products and in the production of laminated resinous products. Likewise, shaped products of high transparency may be secured by molding and polymerizing the fusible polymer or by cast polymerizing the monomer or syrupy polymer.

In accordance with a further modification the polymerization may be conducted until the polymer has been converted to a gel. In such a case solvents are often omitted and the monomer is cast polymerized to the gel state. In treating compounds which are solid, the temperature of polymerization is generally maintained above the melting point thereof. Pressure may be applied to insure fusion of such products. When the polymer has been converted to a gel which contains 20 to 75 percent, and preferably 35 to 60 percent of insoluble matter, it may be removed from the casting mold and shaped, molded, coated, or otherwise treated and may be further polymerized to a more complete stage of polymerization.

The following examples are illustrative:

Example I 43.3 g. (0.43 mole) of allyl carbamate was mixed with 17.0 g. of 37% aqueous formaldehyde (0.22 mole), and 4.5 cc. of concentrated hydrochloric acid slowly added. The mixture was stirred and cooled until it became almost solid. It was allowed to stand for about one-half hour and was then washed with water. The solid was separated by filtration, washed with water, and air dried. The product was a crystalline solid which melted at 95 to 97° C. Upon heating the product with 2 percent benzoyl peroxide at a temperature of 100° C., the product polymerized to form a clear transparent polymer.

Example II 51.7 g. (0.45 mole) of methallyl carbamate was mixed with 16.2 g. of 37% aqueous formaldehyde (0.2 mole) and 8 cc. of concentrated hydrochloric acid added slowly while stirring and cooling. A paste of crystals was formed which was treated with water and the solid separated by filtration. After washing and drying the product was recrystallized from benzene to give a white crystalline solid melting at 92–93° C.

Example III

Methallyl carbamate (0.25 mole) 28.5 g., and 20.3 g. of 37% aqueous formaldehyde (0.25 mole) were mixed together and 5 cc. of concentrated hydrochloric acid added slowly with stirring. The solution became milky due to the formation of an oil and was allowed to stand for about one hour. The oil was then separated and washed with water. It was dried by heating up to 100° C. under reduced pressure (15 mm.) until all volatile material was removed. The residue was a viscous, colorless oil weighing 28.6 g.

Example IV

Methallyl carbamate, 5.7 g. (0.05 mole), was mixed with 1.8 g. (0.025 mole) of methallyl alcohol. Concentrated hydrochloric acid (4.5 cc.) was then added and the solution stirred with cooling. The methallyl alcohol was rapidly isomerized by the acid to isobutyraldehyde which reacted with the carbamate. The white solid which formed was worked up as before to give 3.7 g. of crystals. The melting point of the product was 105–107° C.

Example V

A 50 percent dioxane solution of the compound prepared in accordance with Example IV containing 4 percent by weight of benzoyl peroxide was polymerized by heating at 80–85° C. The viscosity of the solution doubled in 375 minutes. At this time, the polymer was separated by precipitation with methanol.

A portion of the material containing 3 percent benzoyl peroxide was heated in a mold at 150–155° C. and 5000 lbs. pressure for 30 minutes. A transparent polymer was secured.

Example VI

A 50 percent dioxane solution containing 110 g. of the compound prepared in Example III with 4 percent benzoyl peroxide was heated at 80–85° C. for 173 minutes, whereupon the viscosity was doubled. The polymer was precipitated by means of an aqueous solution containing 80 percent methanol.

A portion of the polymer containing 3 percent by weight of benzoyl peroxide was molded at 140° C. and 3000 lbs. pressure for 30 minutes. The product was almost colorless, clear and hard.

Example VII

A solution containing 42 g. of the compound prepared in accordance with Example I was dissolved in 42 g. of dioxane and containing 4 percent benzoyl peroxide was heated at 80–85° C. while stirring. After 105 minutes the viscosity had doubled. The solution was cooled and the polymer separated by adding the solution to methanol.

A portion of the polymer containing 3 percent by weight of benzoyl peroxide was molded at 165° C. and 2000 lbs. pressure for 15 minutes. The product was hard and brittle.

Example VIII

A sample of the material prepared in accordance with Example III containing 5 percent by weight of benzoyl peroxide was heated in an oven at 70° C. A gel formed in about an hour. Further heating up to a temperature of 100° C. gave a hard, slightly yellow polymer.

Example IX

A quantity of methylene bis (allyl carbamate) prepared as in Example I was melted in an oven at 100° C. and 5 percent benzoyl peroxide added. The mixture was heated for a few minutes at 100° C. and then placed in an oven at 80–85° C. After 17 minutes the sample had gelled. Further heating gave a hard, yellow solid.

Example X

Allyl oxamate, 25.8 g. (0.2 mole) was heated with 3.0 g. (0.1 mole) of paraformaldehyde in the presence of 1.2 g. (0.02 mole) of acetic acid at a temperature of 100–110° C. The reaction mixture was cooled and recrystallized from alcohol. The product was a white crystalline solid which polymerized upon heating to 150° C. in the presence of two percent acetone peroxide under a pressure of 1000 pounds per square inch.

Example XI

Allyl phthalamate, 20.5 g. (0.1 mole) was warmed with 4.1 g. (0.05 mole) of 37% aqueous formaldehyde solution and 2 cc. of concentrated hydrochloric acid. After standing for one hour the reaction mixture was treated with water and the solid removed by filtration. After washing with water and drying it was recrystallized from benzene. The product was a white crystalline solid which polymerized at 150° C. in the presence of two percent acetone peroxide.

Although the present invention has been described with particular reference to the specific details of certain embodiments thereof, it is not intended that such details shall be regarded as limitations upon the scope of the invention except insofar as included in the accompanying claims.

I claim:

1. The compound:

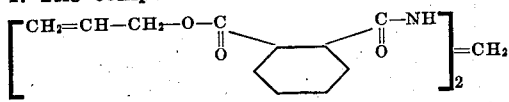

2. The polymer of the compound defined in claim 1.

3. A condensation product of an aldehyde and an ester, said ester having the molecular structure: $R_1$—O—X—$NH_2$, wherein $R_1$ is a radical corresponding to the radical $R_1$ in the alcohol $R_1OH$, said alcohol being an unsaturated monohydric alcohol having from 2–10 carbon atoms and having an unsaturated carbon-to-carbon linkage adjacent the beta carbon atom therein, and X is a radical selected from the group consisting of $$-\overset{O}{\underset{\|}{C}}- \quad \text{and} \quad -\overset{O}{\underset{\|}{C}}-R_2-\overset{O}{\underset{\|}{C}}-\text{radicals}$$

$R_2$ being selected from the class consisting of divalent saturated aliphatic hydrocarbon radicals and the divalent phenylene radical.

4. A polymer of the product defined by claim 3.

5. A condensation product of (A) an aldehyde and (B) allyl carbamate.

6. A polymer of the product defined by claim 5.

7. A condensation product of (A) an aldehyde and (B) methallyl carbamate.

8. A polymer of the product defined by claim 7.

9. A condensation product of (A) an aldehyde and (B) allyl phthalamate.

10. A polymer of the product defined by claim 9.

ALBERT G. CHENICEK.